United States Patent Office 3,792,036
Patented Feb. 12, 1974

3,792,036
PTERIDINE-GLYCOSIDES
Wolfgang Pfleiderer, Constance, Germany, assignor to Ciba-Geigy Corporation, Ardsley, N.Y.
No Drawing. Filed Dec. 24, 1970, Ser. No. 101,391
Claims priority, application Sweden, Jan. 7, 1970, 140/70; Nov. 18, 1970, 17,021/70
Int. Cl. C07c 51/50, 95/04
U.S. Cl. 260—211.5 R    7 Claims

ABSTRACT OF THE DISCLOSURE

Compounds selected from the group consisting of amines of the Formula V

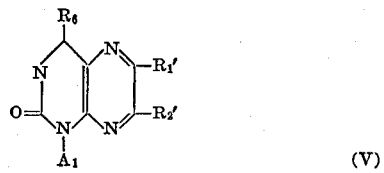

wherein $A_1$ stands for a member selected from 1-aldopentosidyl, 1-aldohexosidyl, mono-desoxygenated 1-adopentosidyl, mono-desoxygenated 1-aldohexosidyl, said radicals with free hydroxyl groups, and said radicals with hydroxyl groups esterified by lower alkanoyl, aroyl and said radicals with hydroxyl groups etherified by aryl-lower alkyl, $R_1'$ and $R_2'$ each stands for a member selected from hydrogen, lower alkyl, phenyl, lower alkyl phenyl, lower alkoxy phenyl, halogeno phenyl and trifluoromethyl phenyl, and $R_6$ stands for a member selected from hydroxy, lower alkoxy, mercapto, lower alkylmercapto, free amino, mono-lower alkylamino and di-lower alkylamino, and their salts are useful as antibacterial agents, especially as agents which are active against viruses. They are obtained by new methods or by methods known per se.

The invention relates to the manufacture of pteridine-glycosides.

Birkofer and Ritter (Ang. Chem. 1964, 414) were the first to succeed in glycosidizing purine derivatives in the 3-position via silyl compounds. The assumption that this synthesis could be applied to 2-oxo-1,2-dihydro-quinoxaline and 2-oxo-3-methyl-1,2-dihydro-quinoxaline however proved unsuccessful (Pteridine Chemistry, Pergamon Press 1964, 100–193). The O-silyl compounds first manufactured did not give the desired glucosidyl derivatives with α-acetobromoglucose even under drastic reaction conditions. From this the expert draws the same conclusion as the author in Pteridine Chemistry, that the synthesis of pteridine-$N_8$-glycosides or also of -$N_1$-glycosides and/or -$N_3$-glycosides by direct glycosidization is not realizable by this route.

Starting from this state of the art, the invention relates to the new 1,2,3,4-tetrahydro-pteridine-glycosides of Formula I

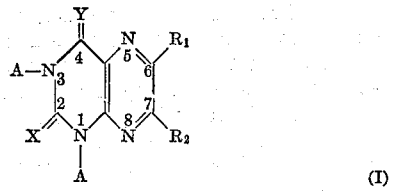

wherein at least one of the radicals A represents a 1-aldopentosidyl or 1-aldohexosidyl radical which is optionally partially desoxygenated and/or optionally possesses functionally modified hydroxyl groups, and the other optionally represents hydrogen or an organic radical, it being possible for the radicals A to be identical or different, X and Y, which can be identical or different, each represent an oxo, thiono or optionally substituted imino group, and $R_1$ and $R_2$, which can be identical or different, each represent hydrogen, an organic radical or a functional group, and tautomers of compounds of Formula I, in which one of the radicals A represents hydrogen, as well as compounds corresponding to the tautomers mentioned, which possess a functionally modified hydroxyl or mercapto group, a disubstituted amino group, an organic radical or hydrogen in one of the positions 2 and 4, as well as processes for their manufacture.

A 1-aldopentosidyl radical is for example a 1-radical of ribose, arabinose, lyxose or xylose, or a 1-methylaldopentosidyl radical, such as a 1-radical of fucose, glucomethylose or rhamnose. Preferably, a 1-aldopentosidyl radical is in the furanose form and primarily represents a 1-ribofuranosidyl radical, as well as a 1-arabinofuranosidyl, 1-lyxofuranosidyl or 1-xylofuranosidyl radical, and also a desoxy-1-aldopentosidyl radical, for example a 2-desoxy-1-ribofuranosidyl radical. In a 1-aldopentosidyl radical, the hydroxyl groups are free or functionally modified.

A 1-aldohexosidyl radical is for example a 1-radical of glucose, allose, altrose, galactose or mannose. Preferably, a 1-aldohexosidyl radical is in the pyranose form and primarily represents a 1-glucopyranosidyl, 1-galactopyranosidyl or 1-mannopyranosidyl radical. In a 1-aldohexosidyl radical, the hydroxyl groups are free or functionally modified. An organic radical is especially an optionally substituted aliphatic, cycloaliphatic, cycloaliphatic-aliphatic, araliphatic or aromatic hydrocarbon radical or an optionally substituted heterocyclic or heterocyclic-aliphatic radical.

Aliphatic hydrocarbon radicals, whereby there are also to be understood aliphatic parts of cycloaliphatic-aliphatic and araliphatic hydrocarbon radicals, as well as of heterocyclic-aliphatic radicals, are above all lower alkyl, lower alkenyl or lower alkinyl radicals.

Cycloaliphatic hydrocarbon radicals are primarily cycloalkyl or cycloalkenyl radicals, optionally containing endo bonds or endo bridges, which in cycloaliphatic-aliphatic hydrocarbon radicals are above all bonded to lower alkyl radicals.

Araliphatic hydrocarbon radicals are for example aryl-lower alkyl or aryl-lower alkenyl radicals, such as monocyclic or bicyclic aryl-lower alkyl or aryl-lower alkenyl radicals.

Aromatic hydrocarbon radicals are aryl radicals, for example monocyclic or bicyclic aryl radicals.

Heterocyclic radicals are primarily monocyclic or bicyclic heterocyclic radicals of aromatic character, such as pyridyl, pyrrolyl, pyrazolyl, imidazolyl, furyl, thienyl, thiazolyl or oxazolyl radicals which in heterocyclic-aliphatic radicals are above all bonded to lower alkyl radicals.

The abovementioned radicals can optionally be monosubstituted, disubstituted or polysubstituted. Thus aliphatic hydrocarbon radicals, including also aliphatic radicals of cycloaliphatic - aliphatic and araliphatic hydrocarbon groups, as well as of heterocyclic-aliphatic groups, especially lower alkyl radicals, can possess functional groups, such as functionally modified hydroxyl or mercapto groups or optionally substituted amino groups, as substituents. The trifluoromethyl group may here be mentioned by way of an example. Aromatic hydrocarbon radicals, including also aromatic radicals of araliphatic hydrocarbon groups, as well as heterocyclic radicals of aromatic character, can for example contain lower alkyl radicals, functionally modified hydroxyl or mercapto groups, trifluoromethyl, nitro or optionally substituted amino groups as substituents, whilst cycloaliphatic hydrocarbon radicals can above all possess lower alkyl radicals or endo-lower alkylene radicals as substituents.

Lower alkyl radicals are, for example, methyl or ethyl radicals or straight or branched propyl, butyl, pentyl, hexyl or heptyl radicals bonded in any desired position, whilst lower alkenyl radicals for example represents allyl, propenyl, methallyl, 3-butenyl or crotyl ralicals, and lower alkinyl radicals for example represent propargyl, 2-butinyl or 3-butinyl radicals.

Cycloalkyl and cycloalkyenyl radicals preferably contain up to 10 ring carbon atoms and in particular denote cyclopentyl, cyclohexyl or cycloheptyl radicals, as well as cyclopentyl or cyclohexenyl radicals.

Phenyl-lower alkyl and phenyl-lower alkenyl radicals are for example benzyl, phenylethyl or phenylpropyl, as well as cinnamyl radicals.

Aromatic radicals are primarily phenyl radicals but can also be naphthyl radicals for example 1-naphthyl or 2-naphthyl radicals.

Pyridyl radicals are 2- 3- or 4-pyridyl radicals, whilst pyrrolyl radicals are for example 2-pyrrolyl radicals, pyrazolyl radicals are for example 3- or 4-pyrazolyl radicals, imidazolyl radicals are for example 2-imidazolyl radicals, furyl radicals are for example 2-furyl radicals, thienyl radicals are for example 2-thienyl radicals, thiazolyl radicals are for example 2-thiazolyl radicals or oxazolyl radicals are for example 2-oxazolyl radicals.

Lower alkyl radicals which carry aryl groups and heterocyclic radicals are for example methyl or ethyl radicals.

Endo bridges are primarily endo-lower alkylene radicals, for example methylene, ethylene or 2,2-propylene radicals.

Functionally modified hydroxyl and mercapto groups are etherified or esterified hydroxyl and mercapto groups, such as halogen atoms or acyloxy groups, lower alkoxy, lower alkenyloxy, cycloalkoxy, cycloalkyl-lower alkoxy or aryl-lower alkoxy groups, as well as lower alkylenedioxy groups, and also lower alkylmercapto groups. Functionally modified hydroxy groups in a 1-pentosidyl or 1-hexosidyl radical are primarily hydroxyl groups etherified or esterified by organic radicals.

Halogen atoms are primarily those with an atomic weight of less than 80, that is to say fluorine, chlorine or bromine atoms.

Acyloxy groups are especially lower alkanoyloxy groups, for example acetoxy or propionyloxy groups, as well as aroyloxy groups, for example benzoyloxy groups.

Lower alkoxy groups are for example methoxy, ethoxy, n-propoxy or isopropoxy groups, whilst lower alkenyloxy groups for example represent allyloxy groups. In cycloalkoxy and cycloalkyl-lower alkoxy groups the cycloaliphatic radical contains up to 10 ring carbon atoms. Radicals of this nature are cyclopentyloxy and cyclohexyloxy groups, as well as cyclopropylmethoxy, cyclopentylmethoxy, cyclohexylmethoxy or 2 - cyclohexylethoxy groups. Aryl-lower alkoxy groups which are in particular also suitable for the etherification of hydroxyl groups in the 1-pentosidyl and 1-hexosidyl radical, are primarily phenyl-lower alkoxy groups, for examle benzyloxy or 2-phenylethoxy groups, and an aromatic radical in such groups can optionally be substituted as noted above. A lower alkylenedioxy radical is for example a methylenedioxy group; in the 1-pentosidyl or 1-hexosidyl radical two hydroxyl groups can be etherified by a methylene radical which is preferably substituted, for example a benzylidene or isopropylidene radical.

Lower alkylmercapto groups are for example methylmercapto or ethylmercapto groups.

Optionally substituted amino groups are secondary or tertiary amino groups which for example contain, as substituents, lower alkyl radicals, or bivalent radicals such as lower alkylene, oxa-lowe alkylene, thia-lowe alkylene or aza-lower alkylene radicals, wherein an aza nitrogen atom can optionally be substituted, for example by one of the above-mentioned hydrocarbon radicals, above all a lower alkyl radical, as well as an optionally substituted phenyl or phenyl-lower alkyl radical, for example 1,4-butylene, 1,5-pentylene, 3-oxa-1,5-pentylene, 3-thia-1,5-pentylene or 3-aza-1,5-pentylene, such as 3-lower alkyl-3-aza-1,5-pentylene, for example 3-methyl-3-aza-1,5-pentylene groups. Further substituted amino groups are the hydrazino group, which can optionally be mono-substituted or disubstituted by a lower alkyl radical, as well as the hydroxyamino group.

Optionally substituted imino groups are especially those which are derived from the abovementioned secondary amino group by a free valency being present in place of the hydrogen atom bonded to the amino nitrogen. Here a substituted imino group, as appropriately indicated above, is also a hydrazino group which is optionally substituted as indicated, or also a hydroxyimino group.

Functional groups $R_1$ and $R_2$ are especially functionally modified hydroxyl or mercapto groups, above all those mentioned above, substituted amino groups, above all those mentioned above, optionally functionally modified carboxyl groups, and preferably free hydroxyl, mercapto or amino groups.

Optionally functionally modified carboxyl groups are, for example, esterified or amidized carboxyl groups.

Esterified carboxyl groups are especially those which are esterified with aliphatic, cycloaliphatic or araliphatic alcohols. Ester-forming alcohols are especially lower alkanols, cycloalkanols or phenylalkanols, which can also possess yet further substituents, for example methanol, ethanol, propanols, butanols, hexanols, cyclopentanols, cyclohexanols or substituted phenyl-lower alkanols, for example phenyl-lower alkanols substituted as indicated above for the aryl-lower alkyl radicals, such as benzyl alcohols or phenylethanols.

Substituents of the aliphatic alcohols are especially amino groups, preferably amino groups substituted as given below for the amide groups, and above all di-lower alkylamino groups, for example dimethylamino or diethylamino groups, or piperidino groups.

In the amidized carboxyl groups (carbamyl groups) the amide nitrogen atom can be unsubstituted, mono-substituted or disubstituted, for example by preferably lower radicals of aliphatic character, for example radicals of aliphatic character possessing at most 8 carbon atoms, which can also be interrupted by hetero-atoms, such as oxygen, nitrogen or sulphur atoms, and/or substituted by functional groups, such as hydroxyl, amino or mercapto groups or halogen atoms. As amide substituents, alkyl, alkenyl or alkylene radicals may for example be mentioned which can also be interrupted by oxygen, sulphur or nitrogen atoms and/or substituted by functional groups, such as hydroxyl, amino or mercapto groups or halogen atoms. Possible amide substituents are especially: lower alkyl radicals such as methyl, ethyl, n-propyl or isopropyl, straight or branched butyl, pentyl, hexyl or heptyl bonded in any desired position, lower alkenyl radicals, such as for example allyl or methallyl, lower alkylene radicals such as for example butylene-(1,4), pentylene-(1,5), hexylene-(1,6) or heptylene-(2,6), cycloalkyl or cycloalkyl-alkyl radicals or corresponding radicals interrupted by the hetero-atoms mentioned, such as for example lower alkoxyalkyl, alkylmercaptoalkyl or mono- or di-alkylamino-alkyl radicals such as for example 2-methoxyethyl, 2-ethoxyethyl, 3-methoxypropyl, 2-methylmercaptoethyl or dimethyl-, methylethyl- or diethyl-amino-alkyl groups, alkyleneaminoalkyl group or oxa-, aza- or thia-alkyleneaminoalkyl groups, wherein possible alkylene radicals or oxa-, aza- or thia-alkylene radicals are for example those mentioned below, or oxa- aza- or thia-alkylene radicals such as 3-oxa, 3-aza- or 3-thia-pentylene-(1,5), 3-methyl- or 3-ethyl-3-aza-hexylene-(1,6), 3-azahexylene-(1,6) or 4-methyl-4-aza-heptylene-(2,6), or radicals of this nature substituted by functional groups, such as 3-chloroethyl- or 3-hydroxyethyl-3-aza-pentylene-(1,5), phenyl radicals or phenylalkyl radicals which can be unsubstituted or above all substituted in the phenyl radical as indicated for the phenyl-lower alkyl radicals.

The amino group of the amidized carboxyl group (carbamyl group) is in particular a free, mono- or di-lower alkylated amino group, or an optionally C-lower alkylated pyrrolidino, piperidino, morpholino, thiomorpholino, piperazino, N'-lower alkylpiperazino or N'-(hydroxy-lower alkyl)-piperazino group, for example the N'-methylpiperazino group or the N'-(β-hydroxyethyl)-piperazino group, or N'-phenylpiperazino group or also an amino group substituted by a hydroxyl or amino group.

The compounds according to the invention possess valuable pharmacological properties. Thus they for example display effects against excitants of malaria and *Tubercular bacilli, Pathogenic fungi*, as well as *Trichomonades* or *amoebae*, and also against gram-positive and gram-negative bacteria and primarily against viruses, especially against herpes virus and influenza virus, as can be shown, for example, in a tissue culture infected with influenza or herpes simplex virus at a concentration of approx. 3–30 γ/ml., and are useful especially as anti-bacterial agents, especially agents which are active against viruses. They can furthermore be used as starting substances for the manufacture of other valuable compounds, especially pharmacologically active compounds.

Compounds to be particularly highlighted are those of Formula IV

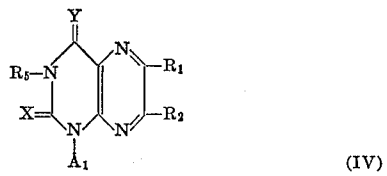

(IV)

wherein $R_1$, $R_2$, X and Y have the above significance, $A_1$ represents a 1-aldopentosidyl or 1-aldohexosidyl radical which is optionally partially mono-desoxygenated and/or optionally possesses hydroxyl groups which are esterified or etherified by organic radicals, especially by lower alkanoyl, benzoyl or benzyl radicals, and $R_5$ represents an organic radical, especially a lower alkyl radical, or above all hydrogen, as well as tautomers of compounds of Formula IV in which $R_5$ represents hydrogen, as well as the tautomers mentioned, which possess a functionally modified hydroxyl or mercapto group, a disubstituted amino group, an organic radical, especially a lower alkyl radical, or hydrogen in the 4-position.

Particularly valuable compounds of this type are compounds of Formula V

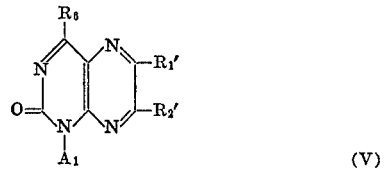

(V)

wherein $A_1$ represents a 1-aldopentosidyl or 1-aldohexosidyl radical which is optionally partially mono-desoxygenated and/or optionally possesses hydroxyl groups which are esterified or etherified by lower alkanoyl, benzoyl or benzyl radicals, $R_1'$ and $R_2'$, which are identical or different, each represent lower alkyl, hydroxyl, free amino or halogen, and $R_6$ represents a free, etherified or esterified hydroxyl or mercapto group or a free amino group, a mono-lower alkylamino group or a di-lower alkylamino group, or salts of such compounds, and above all compounds of Formula V, wherein $A_1$ has the meaning indicated above, $R_1'$ and $R_2'$ each represent hydrogen, lower alkyl or phenyl which is optionally substituted once or severally by lower alkyl, lower alkoxy, halogen or trifluoromethyl, and $R_6$ represents free amino or mercapto, and salts and tautomers of these compounds, in particular 1-(1-D-glucopyranosidyl)-lumazine,
1-(1-D-ribofuranosidyl)-lumazine,
1-(1-D-ribofuranosidyl)-2-oxo-4-amino-1,2-dihydro-pteridine,
1-(1-D-ribofuranosidyl)-2-oxo-4-mercapto-1,2-dihydro-pteridine,
1-(1-D-glucopyranosidyl)-2-oxo-4-amino-6,7-dimethyl-1,2-dihydro-pteridine,
1-(1-D-ribofuranosidyl)-2-oxo-4-dimethylamino-1,2-dihydro-pteridine,
1-(1-D-ribofuranosidyl)-6,7-dimethyl-lumazine,
1-(1-D-arabinofuranosidyl)-2-oxo-4-amino-1,2-dihydro-pteridine,
1-(1-D-2-desoxyribofuranosidyl)-2-oxo-4-amino-1,2-dihydro-pteridine,
1-(1-D-arabinofuranosidyl)-2-oxo-4-mercapto-1,2-dihydro-pteridine,
1-(1-D-2-desoxyribofuranosidyl)-2-oxo-4-mercapto-1,2-dihydro-pteridine,
1-(1-D-arabinofuranosidyl)-lumazine,
1-(1-D-2-desoxyribofuranosidyl)-lumazine,
1-(1-D-ribofuranosidyl)-6,7-diphenyl-lumazine,
1-(1-D-ribofuranosidyl)-2-oxo-4-amino-6,7-diphenyl-1,2-dihydro-pteridine,
1-(1-D-ribofuranosidyl)-2-oxo-4-methylamino-1,2-dihydro-pteridine, and
especially 1-(1-D-2-desoxyribofuranosidyl)-6,7-diphenyl-lumazine,
which is virucidal towards a tissue culture infected with herpes simplex virus at a concentration of approx. 3–30 γ/ml., their O-acetyl and O-benzoyl derivatives, and salts and/or anomers, especially β-anomers, of such compounds.

It has surprisingly been found that compounds of Formula I are obtained if a compound of Formula II

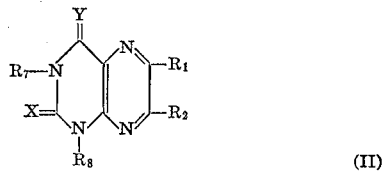

(II)

wherein $R_1$ and $R_2$ have the above significance, at least one of the radicals X and Y represents an oxo group and the other has the above significance, at least one of the radicals $R_7$ and $R_8$ represents hydrogen and the other optionally represents A, is O-metallized in at least one of the positions 2 and 4 with a compound of a tetravalent metal of the 4th main group and 3rd to 5th period of the periodic system, and the O-metallized compound or a tautomer of a compound of Formula II, wherein the oxo group X and/or Y is present in its tautomeric OH-form and is reactively esterified, especially in a methoxy group, is reacted with a compound of Formula III.

(III)

wherein A has the above significance and X' represents a reactive functionally modified hydroxyl group.

A reactive functionally modified hydroxy group is especially a reactive esterified or etherified hydroxy group.

In a compound of Formula III a reactive esterified hydroxyl group is especially a hydroxyl group esterified by an inorganic or organic acid, such as an alkylcarboxylic or arylcarboxylic acid, for example acetic acid or benzoic acid, by an arylsulphonic acid, for example p-toluenesulphonic acid, and preferably by a hydrohalic acid, for example hydrochloric acid, hydrobromic acid or hydroiodic acid. In a suitable manner further hydroxyl groups present in the sugar residue are esterified or etherified as indicated above, preferably by benzyl, benzoyl or acetyl groups.

A reactive etherified hydroxy group is especially a hydroxy group etherified by an aliphatic or aromatic hydrocarbon residue, such as one of those named above. Most suitable of all are lower alkoxy and aryloxy groups, such as methoxy and phenyloxy groups. In suitable manner further hydroxy groups present in the sugar residue are esterified or etherified as indicated above, preferably by benzyl, benzoyl or acetyl groups.

The O-metallization of a compound of Formula II can be carried out with compounds of tetravalent germanium, tin and especially silicon. For example, a compound of Formula II can be reacted with a tri-lower alkyl-germanium halide, such as trimethyl-germanium chloride, or a tri-lower alkyl-tin halide, such as trimethyl- or triethyl-tin chloride. The manufacture of the O-metallized compounds can above all be carried out by reaction of a compound of Formula II with a trialkyl-silyl, triaryl-silyl or tri-(arylalkyl)-silyl compound, such as with a tri-lower alkyl-halogenosilane, N-tri-lower alkyl-silyl-di-lower alkylamine, bis-tri-lower alkylsilyl-lower alkanoyl-amide or tri-lower alkylsilyl-N-lower alkyl-lower alkanoyl-amide, or also with a hexa-lower alkyldisilazane, preferably with trimethyl-chlorosilane, N-trimethylsilyl-diethyl-amine, bis-trimethylsilyl-acetamide, trimethylsilyl-N-methyl-acetamide and especially with hexamethyldisilazane.

In the above O-metallizations, above all in reactions with hexa-lower alkyldisilazanes, a catalyst is used in a suitable manner, especially an acid catalyst, such as a strong inorganic acid, preferably concentrated sulphuric acid, or a salt thereof which reacts acid, such as for example ammonium sulphate or ammonium bisulphate. The meltallizing agent, especially the silylizing agent, is advantageously used in excess and/or simultaneously used as the solvent. The reaction can however also be carried out in an inert solvent, for example benzene or toluene, and optionally at elevated temperature.

In the reaction with one of the abovementioned metal halides, such as trimethylchlorosilane, a halogen-binding substance, such as an organic nitrogen base, for example triethylamine or pyridine, is advantageously added in order to lower the reaction temperature and the duration of reaction and to increase the yields, in which case the addition of an acid catalyst is superfluous.

A very mild O-silylation consists in the reaction of a compound of Formula II with N-trimethylsilylacetamide, preferably in the presence of a tertiary amine, such as triethylamine, in which case only neutral acetamide is produced as a by-product and can be separated off by filtration.

In the reactions mentioned, the process is carried out with exclusion of water. Where appropriate, it is carried out under a protective atmosphere, for example of nitrogen or argon.

In the reaction of the O-metallized pteridine with a compound of Formula III a heavy metal compound is appropriately used, for example heavy metal oxides, hydroxides or salts, especially mercury-(II) oxide, mercury-(II) halides, such as mercury-(II) chloride, or mercury-(II) cyanide. The reaction is carried out at room temperature or preferably at elevated temperature.

O-metallized, above all O-silylized, pteridine can furthermore be melted together with the sugar derivative, in which case the addition of a heavy metal compound and/or of a catalyst can, where appropriate, be dispensed with.

On using a tautomer of the compound of Formula II in the above stated form, the reaction is carried out without O-metallization and preferably with a compound of Forfula III, wherein X' represents a reactive esterified hydroxy group, especially a halogen atom.

The compounds of Formula I can however also be obtained according to methods which are in themselves known, for example if, in a compound of Formula VI

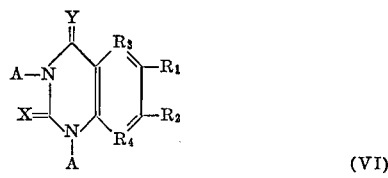

(VI)

wherein A, X, Y, $R_1$ and $R_2$ have the above significance, one of the radicals $R_3$ and $R_4$ represents two radicals which can together be converted into the —N= grouping and the other represents the —N= grouping, or in a tautomer thereof, or in a compound corresponding to one of the tautomers mentioned, which in one of positions 2 and 4 possesses a functionally modified hydroxyl or mercapto group, a disubstituted amino group, an organic radical or hydrogen, $R_3$ or $R_4$ is converted into the —N= grouping.

Two radicals $R_3$ or $R_4$ which can together be converted into the —N= grouping are for example those in which the radical bonded to the pyrimidine nucleus represents a free amino group and the other represents an optionally reactively modified oxo group.

Reactively modified oxo groups are, for example, hemiethers, bisethers, hemiesters or bisesters of the hydrato form of the oxo group. As ethers, hemiacetals, acetals, hemiketals or ketals may for example be mentioned, and preferably those ethers are used which possess lower alkoxy groups or lower alkylenedioxy groups, such as methoxy, ethoxy or ethylene-1,2-dioxy groups. In hemiesters or bisesters at least one of the two OH groups of the hydrato form is reactively esterified, for example with a strong inorganic acid, especially with a hydrohalic acid, such as hydrochloric or hydrobromic acid, or with an organic carboxylic acid, such as an alkylcarboxylic acid, for example acetic acid.

The starting compounds used in this reaction are obtained as intermediates if an appropriate 5,6-diaminopyrimidine is reacted in a manner which is in itself known with a compound of formula $R_2$—CO—CO—$R_1$ or one of its reactive oxo derivatives, especially those mentioned above.

In this case the conversion into an —N= grouping is carried out under customary ring closure condensation conditions, preferably in an inert solvent, at elevated temperature and optionally in the presence of a catalyst, such as a basic catalyst, for example an alkali hydroxide, such as sodium hydroxide (compare Pteridine Chemistry, supra, page 21/22).

Two radicals $R_3$ or $R_4$ which can together be converted into an —N= grouping are furthermore, for example, those in which the radical bonded to the pyrimidine nucleus represents a nitroso group and the other represents two hydrogen atoms. Here a catalyst, especially a basic catalyst, for example one of the above, is preferably used. The reaction is carried out in a suitable manner in an inert solvent and at elevated temperature (compare Pteridine Chemistry, supra, page 65 and thereafter). The starting compounds here used are obtained as intermediates if an appropriate 5-nitroso-6-amino-pyrimidine is reacted, in a manner which is in itself known, with a compound of formula $R_1$—$CH_2$—CO—$R_2$ or a reactive oxo derivative thereof, for example one of those mentioned above.

The compounds of Formula I are furthermore obtained if, in an appropriate pteridine-glycoside which is partially hydrogenated in the pyrazino ring, or in a tautomer thereof, or in a compound corresponding to one of the tautomers mentioned, which possesses a functionally modified hydroxyl or mercapto group, a disubstituted amino group, an organic radical or hydrogen in one of positions 2 and 4, the pyrazino ring is aromatized.

The aromatization can be carried out with the customary dehydrogenation agents, such as with oxygen, with a heavy metal catalyst, especially palladium or platinum, above all on charcoal, in a particularly mild manner with chloranil, especially in an inert solvent such as toluene or xylene, preferably at the boiling point of the solvent, or also with sulphur or amorphous or crystalline selenium at elevated temperature. The starting compounds here used are obtained as intermediates if an appropriate 5,6-diaminopyrimidine is reacted with a compound of formula $R_1$—CO—CHOH—$R_2$, or if an appropriate 5-oxo-6-hydroxy-pyrimidine or a 5-hydroxy-6-oxopyrimidine or a 5,6-dihalogeno-pyrimidine, for example dichloro-pyrimidine, is reacted with a compound of formula $$R_1\text{—CHNH}_2\text{—CHNH}_2\text{—R}_2,$$

in which case the dihydropteridine formed can be aromatized without isolation (compare Pteridine Chemistry, supra, pages 181 and 234).

In resulting compounds, functionally modified groups can be converted into other groups according to methods which are in themselves known. Inter alia, halogen atoms can be converted into primary amino groups, for example by treatment with ammonia; the primary amino groups can be converted into secondary or tertiary amino groups by substitution (for example by treatment with reactive esters of alcohols of aliphatic character, such as the corresponding halides, for example chlorides, bromides or iodides, or organic sulphonyloxy compounds, for example p-methylphenyl-sulphonyloxy compounds, or with aldehydes or ketones and simultaneous or subsequent reduction, for example with catalytic hydrogen, formic acid or sodium borohydride), or into halogen atoms by diazotisation (for example with nitrous acid) followed by treatment with the reagents used in the Sandmeyer reaction (for example treatment with copper-I halides, such as copper-I chloride), or into hydroxyl groups by diazotization followed by boiling with water. Etherified hydroxyl groups can be converted into free hydroxyl groups hydrolytically (for example by treatment with a mineral acid, such as hydrobromic or hydriodic acid), and a benzyloxy group present in the pentosidyl or hexosidyl radical can for example also be converted into the free hydroxyl group hydrogenolytically (for example by treatment with catalytically activated hydrogen) and esterified hydroxyl groups can be converted into free hydroxyl groups hydrolytically (for example by treatment with a suitable base, it also being possible for the saponification of an acylated hydroxyl group to take place under the reaction conditions, for example in the presence of a metal alcoholate); the free hydroxyl groups can be etherified according to methods which are in themselves known (for example by treatment with a diazo compound, such as diazomethane, if necessary in the presence of a catalyst of the Lewis acid type, such as fluoboric acid or aluminium alcoholate), or esterified according to methods which are in themselves known (for example by treatment with esterifying agents such as acid halides, such as chlorides or anhydrides). If necessary, free hydroxyl groups can be transiently protected, for example by etherification with hydrogenolytically removable groups, such as benzyl groups, or esterification with hydrolytically removable acids such as organic carboxylic or sulphonic acids, and be liberated, if desired, after carrying out the reaction, for example hydrogenolytically (such as by treatment with hydrogen in the presence of a metal catalyst such as a palladium catalyst), or hydrolytically (such as by treatment with a suitable basic hydrolysis agent). If required, free mercapto groups can transiently be protected by hydrogenolytically removable groups, such as benzyl groups, and optionally be liberated hydrogenolytically after carrying out the reaction, for example by treatment with sodium in liquid ammonia.

Depending on the reaction conditions, the new compounds are obtained in the free form or in the form of their salts, especially their acid addition salts; these are also comprised by the present invention. Free compounds and acid addition salts can be converted into one another according to methods which are in themselves known, free compounds for example into their acid addition salts by treatment with acids or suitable ion exchangers and acid addition salts for example into the free compounds by treatment with basic agents or suitable ion exchangers, as well as into other salts, for example with metal salts in suitable solvents or with ion exchangers.

Acid addition salts are preferably pharmaceutically usable non-toxic acid addition salts, such as those with inorganic acids, for example hydrochloric, hydrobromic, sulphuric, phosphoric, nitric or perchloric acid, or with organic acids, such as aliphatic, alicyclic, aromatic or heterocyclic carboxylic or sulphonic acids, for example formic, acetic, propionic, succinic, glycollic, lactic, malic, tartaric, citric, maleic, hydroxymaleic, pyruvic, phenylacetic, benzoic, p-aminobenzoic, anthranilic, p-hydroxybenzoic, salicylic, p-aminosalicylic, embonic, methanesulphonic, ethanesulphonic, hydroxyethanesulphonic, ethylenesulphonic, halogenobenzenesulphonic, toluenesulphonic, naphthalenesulphonic, N-cyclohexyl-sulphamic or sulphanilic acid, methionine, tryptophane, lysine or arginine, as well as ascorbic acid. Salts can optionally be in the form of hemihydrates, monohydrates, sesquihydrates or polyhydrates.

Metal salts can furthermore be converted into the free compounds by reaction with acid agents in a manner which is in itself known, for example with suitable ion exchangers. Free compounds can furthermore be converted into salts, preferably non-toxic, pharmaceutically usable salts, by means of metal oxides or hydroxides, for example those of alkali or alkaline earth metals, as well as by means of ammonia or suitable amines.

The above mentioned salts as well as other salts of the new compounds, for example their picrates, can optionally be used for purifying the resulting free compounds (with the free compound being converted into a salt thereof, the latter being isolated and the free compound again being liberated therefrom) or can be used for their characterization. As a result of the close relationships between the new compounds in the free form and in the form of their salts, the free compounds or the salts are, in the preceding and following texts, where appropriate also to be understood to include the corresponding salts or free compounds, as regards sense and purpose.

If desired, a resulting isomer mixture, for example an anomer mixture, can be separated into the individual isomers, for example the α- and β-anomers, according to methods which are in themselves known, for example by means of adsorption and fractional elution (for example by chromatography, such as thin layer chromatography) and/or fractional crystallization. For steric reasons, the formation of the β-anomer is preferred in many of the above reactions.

The starting substances used according to the invention are known or can, if they are new, be manufactured according to methods which are in themselves known.

It is possible, at any suitable stage of a process for the manufacture of the starting substances, to separate resulting anomer mixtures according to methods which are in themselves known.

The invention also comprises those modifications of the present process, according to which an intermediate product obtainable at any stage is used as the starting material and the additional process steps are carried out therewith, as has been described above for the multistage process, or in which the process is stopped at any stage. The invention furthermore also comprises those embodiments according to which a starting material is formed under the reaction conditions or is used in the form of a derivative, for example a salt. Thus the O-metallized pteridines can be isolated or also be directly used further for the glycosidation in the form of the reaction mixture obtained.

Preferably, such starting substances are used as lead to the compounds described above as being particularly valuable.

The new compounds can be used in the form of medicines, for example in the form of pharmaceutical preparations in which they are present in the free form or in the form of their salts together with organic or inorganic, solid or liquid, pharmaceutically usable excipients, and which are suitable for enteral, for example oral, or parenteral administration. As excipients, substances are used which are inert towards the new compounds, such as water, gelatine, sugars, for example lactose or glucose, starches, for example wheat starch or maize starch, stearyl alcohol, stearic acid or salts thereof, for example magnesium stearate, talc, vegetable oils, benzyl alcohols, gum, polyalkylene glycols, propylene glycol or other known excepients. The pharmaceuitical preparations can be in the solid form, for example as tablets, dragées, capsules or suppositories, or in the liquid form, for example as solutions, suspensions or emulsions. They can be sterilized and/or contain auxiliary substances, such as preservatives, stabilizers, wetting agents or emulsifiers, solubilizing agents, salts for regulating the osmotic pressure or buffers, and also, optionally, other pharmacologically valuable compounds. They are formulated according to methods which are in themselves known.

The new compounds can also be used in veterinary medicine for example in one of the abovementioned forms, or as an additive to feedstuffs, for example together with the usual diluents and feedstuffs.

The invention is described in more detail in the examples which follow.

EXAMPLE 1

6.3 g. of lumazine (0.04 mol) are added to 25 ml. of hexamethyldisilazane. Two drops of concentrated sulphuric acid are added thereto. The suspension thus obtained is stirred at 150° C. bath temperature, with exclusion of moisture and under reflux, until the evolution of $NH_3$ ceases and a clear solution has been produced after about 30–60 hours. Thereafter excess hexamethyldisilazane is distilled off at normal pressure. The remaining product is distilled in a high vacuum at a bath temperature of about 170° C. Here a short air condenser is used since the product crystallizes very easily. 2,4-bis-O-trimethylsilyl-lumazine of boiling point 110° C. (0.03 mm. Hg) and melting point 95–96° C. is obtained in the form of a colorless crystal mass.

9.2 g. of 2,4-bis-O-trimethylsilyl-lumazine (0.03 mol) and 12.3 g. of acetobromoglucose (0.03 mol) are added to a suspension of 7.5 g. of HgO and 7.5 g. of mercury-(II) bromide in 200 ml. of absolute benzene. The suspension is stirred for 4 hours at a bath temperature of 100° C. with exclusion of moisture and under reflux. Thereafter the insoluble mercury salts are filtered off and the solution is concentrated to dryness in a rotary evaporator. The residual yellow foam is taken up in 400 ml. of chloroform and the resulting solution is extracted by shaking 3 times with a total of 400 ml. of 10% strength aqueous KI solution. The chloroform solution is concentrated to dryness and the residual yellow foam is boiled up with 100 ml. of methanol. Hereupon 1-(2',3',4',6'-tetra-O-acetyl - 1 - β-D-glucopyranosidyl)-lumazine of formula

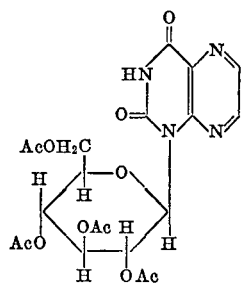

precipitates. It is filtered off and washed with a little cold benzene, whereupon the compound is obtained as a pale yellow powder of melting point 247–249° C. Recrystallization from n-propanol (about 7 mg. per 1 ml.) yields pale yellow small needles of melting point 250–252° C.

1-(1-β-D-glucopyranosidyl) - lumazine is obtained therefrom by desacetylation.

EXAMPLE 2

6.1 g. of 2,4-bis-O-trimethylsilyl-lumazine, manufactured as described in Example 1, are dissolved in 100 ml. of absolute benzene. A freshly prepared solution of 1-bromo-2,3,5-tri - O - benzoyl-ribofuranose (manufactured from 15.1 g. of 1-O-acetyl-2,3,5-tribenzoyl-ribofuranose and hydrogen bromide according to D. J. Stevens, R. K. Ness and H. G. Fltcher, J. Org. Chem. 33, 1809, 1968) in 50 ml. of absolute benzene is added, and after adding 7.5 g. of mercury-(II) oxide and 7.5 g. of mercury-(II) bromide the mixture is heated for 4 hours under reflux, with exclusion of moisture. Thereafter the reaction mixture is filtered and the filtered residue is washed with a little methanol and about 150 ml. of chloroform. The filtrate is concentrated to dryness, the residue is taken up in 300 ml. of chloroform, insoluble matter is removed by filtration, and the solution is extracted 3 times by shaking with a total of 300 ml. of 15% strength potassium iodide solution. Thereafter the chloroform solution is extracted by shaking with 100 ml. of water, and the chloroform layer is separated off and dried over sodium sulphate. It is concentrated to dryness in a rotary evaporator, whereupon an amorphous foam remains. The product is purified by preparative layer chromatography on silica gel using chloroform/acetone, 9:1, as the running agent mixture. 1-(2',3',5'-tri-O-benzoyl-1-β-D-ribofuranosidyl)-lumazine of formula

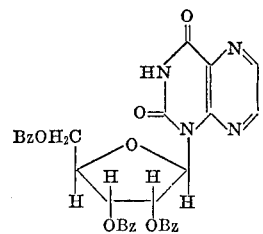

is obtained as an amorphous solid product and is employed in this form for the desacetylation. 20 ml. of absolute methanol and 100 mg. of sodium ethylate (10% excess) are added to 1 g. of crude 1-(2',3',5'-tri-O-benzoyl - 1 - β - ribofuranosidyl)-lumazine. This suspension is stirred for 12 hours at room temperature with exclusion of moisture. The mixture is then filtered and the slightly yellowish solid is washed with absolute methanol. It is the sodium salt of the end product. This is dissolved in 20 ml. of water and neutralized with acid ion exchanger (Dowex 50). The ion exchanger is separated off and the aqueous solution is concentrated almost to dryness in a rotary evaporator. 20 ml. of n-propanol are added to the colorless syrup, and the mixture is briefly boiled up and left to crystallize at −5° C. 1-(1-β-D-ribofuranosidyl)-lumazine of formula

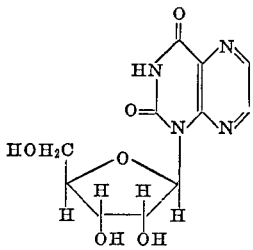

is obtained in the form of colorless crystals of melting point 184° C.

EXAMPLE 3

1.32 g. of 2-oxo-4-amino-1,2-dihydro-pteridine are heated for 5 days under reflux with 15 ml. of hexamethyldisilazane at a bath temperature of 150° C. The excess hexamethyldisilazane is thereafter removed in vacuo and the residue is evaporated at $10^{-3}$ mm. Hg and a bath temperature of 180° C., in the course of which the silyl compound distils over at about 135° C.

The resulting silyl compound is dissolved in 150 ml. of absolute toluene, and mixed with 3.15 g. of 1-bromo-2,3,5-tri-O-benzoyl-ribofuranose as well as 1.5 g. of mercury-(II) oxide and 1.5 g. of mercury-(II) bromide. The mixture is heated for 2½ hours under reflux, insoluble matter is filtered off and the filtrate is concentrated. The residue is taken up in 30 ml. of chloroform and the resulting red solution is extracted by shaking 3 times with 100 ml. portions of 20% strength potassium iodide solution and once with 100 ml. of water. The chloroform layer is dried for 12 hours with anhydrous sodium sulphate, after which the solvent is stripped off. After recrystallization from 50 ml. of propanol, 1-(2′,3′,5′-tri-O-benzoyl-1-β-D-ribofuranosidyl) - 2-oxo-4-amino-1,2-dihydro-pteridine of formula

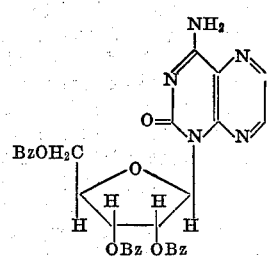

is obtained in the form of colorless crystals of melting point 110–120° C.

2.8 g. of 1-(2′,3′,5′-tri-O-benzoyl-1-β-D-ribofuranosidyl)-2-oxo-4-amino-1,2-dihydro-pteridine are dissolved in 100 ml. of absolute ethanol at room temperature and catalytic amounts of sodium methylate are then added with stirring until following the reaction by thin layer chromatography no longer shows any starting product. 20 ml. of water are added and the solution is neutralized by treatment with acid ion exchanger (Dowex 50). Thereafter it is concentrated to dryness. This process for removing the benzoic acid ester formed is repeated 5 more times by adding water and concentrating in a rotary evaporator. The resulting residue is purified by silica gel chromatography with chloroform/methanol 6:1 as the running agent. After extraction of the main zone and renewed concentration in a rotary evaporator, the product is recrystallized from propanol/water, whereupon 1-(1-β-D-ribofuranosidyl) - 2-oxo-4-amino-1,2-dihydro-pteridine is obtained in the form of colorless crystals of melting point 148° C.

EXAMPLE 4

1.2 g. of 2-oxo-4-dimethylamino-1,2-dihydro-pteridine are silylated for 17 hours with hexamethyldisilazane as described in Example 3. Thereafter the ribosidation is carried out as described in Example 3, with 1.42 g. of 1-bromo-2,3,5-tri-O-benzoyl-ribofuranose. The resulting product is purified by recrystallization from ethanol, whereupon 1-(2′,3′,5′-tri-O-benzoyl-1-β-D-ribofuranosidyl) - 2 - oxo-4-dimethylamino-1,2-dihydro-pteridine of formula

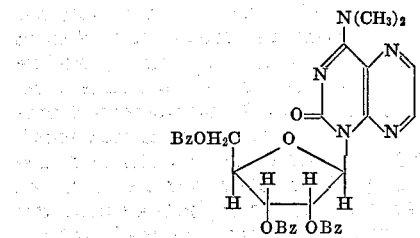

is obtained in the form of colorless crystalls of melting point 100–110° C.

1-(1-β-D-ribofuranosidyl) - 2 - oxo-4-dimethylamino-1,2-dihydro-pteridine is obtained therefrom by debenzoylation.

EXAMPLE 5

0.5 g. of 2-oxo-4-amino-6,7-dimethyl-1,2-dihydro-pteridine are heated for 90 hours under reflux with 5 ml. of hexamethyldisilazane at an oil bath temperature of 150–160° C. The excess hexamethyldisilazane is removed in vacuo and the residue is taken up in 500 ml. of absolute toluene. After adding 1.2 g. of acetobromoglucose, 0.7 g. of mercury-(II) oxide and 0.7 g. of mercury-(II) bromide, the mixture is heated for 2 hours under reflux. Insoluble matter is filtered off, the filtrate is concentrated and the residue is taken up in 50 ml. of chloroform. The chloroform solution is extracted by shaking 3 times with 50 ml. portions of a 20% strength potassium iodide solution and subsequently with 50 ml. of water. The chloroform solution is dried and then concentrated to dryness, and the residue is purified by recrystallization from n-butanol, whereupon 1(2′,3′,4′,6′-tetra-O-acetyl-1-β-D - glucopyranosidyl)-2-oxo-4-amino-6,7-dimethyl - 1,2 - dihydropteridine of formula

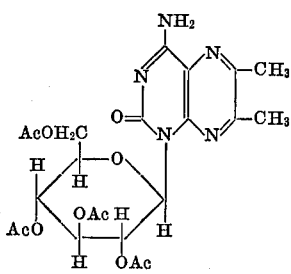

is obtained which melts from 225° C. onwards with discoloration.

1-(1-β-D-glucopyranosidyl) - 2 - oxo - 4-amino-6,7-dimethyl-1,2-dihydro-pteridine is obtained by desacetylation.

EXAMPLE 6

2.9 g. of 2,4-bis-O-trimethylsilyl-lumazine (10 mmols) are reacted with one equivalent of 1-bromo-2,3,5-tri-O-benzoyl-ribofuranose in the presence of 2.5 g. of mercury-(II) oxide and 2.5 g. of mercury-(II) bromide, in accordance with the process described in Example 2. After working up in accordance with Example 2, the crude product is purified by preparative layer chromatography on silica gel, by twice developing with chloroform/acetone, 20:1. After elution of the main zone, the eluate is concentrated by evaporation in a rotary evaporator and the amorphous residue is recrystallized by dissolving in 80 ml. of hot ethanol and 120 ml. of water. On standing at —5° C., 1-(2′,3′,5′-tri - O-benzoyl-1-β-D - ribofuranosidyl)-6,7-dimethyl-lumazine of formula

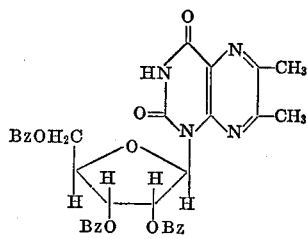

separates out in the form of colorless crystals of melting point 120° C.

1-(1-β-D-ribofuranosidyl)-6,7-dimethyl-lumazine is obtained therefrom by debenzoylation.

EXAMPLE 7

6,7-diphenyl-lumazine (12.64 g.) is heated for 2 days under reflux in 30 ml. of hexamethyldisilazane with some crystals of ammonium sulphate. The excess hexamethyldisalazane is stripped off in a water-pump vacuum and the residue subsequently dissolved in 60 ml. of benzene. The resulting benzene solution is mixed with 2-desoxy-3,5-di-O-p-tolyl-D-ribofuranosyl chloride (15.5 g.) and 10 g. each of mercury-(II)-oxide and mercury-(II)-bromide. The mixture is stirred for one week at ambient temperature, then evaporated to dryness and the residue is digested with 200 ml. of chloroform. The insoluble matter is thereafter filtered off and the chloroform filtrate extracted three times by shaking with 200 ml. each time of 20% of potassium iodide solution. The chloroform solution is washed with water, dried over sodium sulphate and concentrated to approx. 50 ml. This solution is poured onto a dry silica gel column measuring 100 x 3 cms. in the plastic tube (silica gel inactivated with 10% water) and developed with chloroform/acetone (9:1) to the end of the column. Three blue fluorescent zones are obtained, of which the most slowly moving, broadest zone is cut out and eluted with ethyl acetate. After concentrating the eluate by evaporation, an amorphous product in the form of foam is obtained. The crude product consists of the anomer mixture, which is separated by preparative chromatography over silica gel plates measuring 40 x 20 x 0.2 cms. 300 mg. of crude product in 2 ml. of chloroform is applied per plate and eluted six times with chloroform/acetone (9:1). Separation occurs in two zones, of which the more slowly moving zone contains the α-anomer and the more quickly moving one the β-anomer. After separate elution with ethyl acetate, the eluate is evaporated, taken up in chloroform, then three times its volume of methanol is added. After a short time crystals form. 1-(1-α-D-2'-desoxy-3',5'-di-O-p-tolyl - ribofuranosidyl)-6,7-diphenyl-lumazine is thus obtained in the form of colorless crystals which melt at 155–160° C., and 1-(1-β-D-2'-desoxy-3',5'-di - O-p-tolyl-ribofuranosidyl)-6,7-diphenyl-lumazine in the form of colorless crystals which melt at 155–160° C.

150 mg. of sodium is dissolved in 80 ml. of absolute methanol and 1-(1-α-D-2'-desoxy-3',5'-di-O-p-tolyl-ribofuranosidyl)-6,7-diphenyl-lumazine (4 g.) is added. The mixture is stirred for 16 hours at 25° C. with exclusion of moisture, treated thereafter with 120 ml. of water, heated to the boil and acidified with glacial acetic acid to pH 5. After the reaction mixture has cooled, the precipitate that has formed is collected and recrystallized from a mixture of 150 ml. of methanol and 25 ml. of water. 1-(1-α-D-2'-desoxy-ribofuranosidyl)-6,7,-diphenyl-lumazine of formula

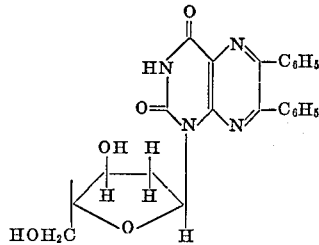

is obtained in the form of colorless crystals which melt at 190–192° C.

100 mg. of sodium is dissolved in 80 ml. of absolute methanol and 1-(1-β-D-2'-desoxy-3',5'-di-O-p-tolyl-ribofuranosidyl-6,7-diphenyl-lumazine (2.6 g.) is added. The mixture is stirred for 16 hours at 25° C. with exclusion of moisture, and worked up as described above, when 1 - (1 - β - D - 2' - desoxy - ribofuranosidyl)-6,7-diphenyl-lumazine of formula

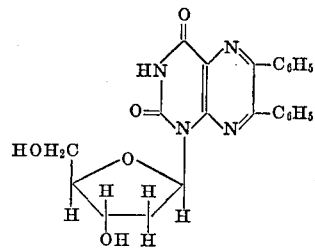

is obtained in the form of colorless crystals which melt at 158–160° C.

EXAMPLE 8

6,7-diphenyl-lumazine (6.32 g.) is heated for two days with exclusion of moisture at 150° C. in 15 ml. of hexa- methyldisilazane and with addition of some crystals of ammonium sulphate. The excess hexamethyldisilazane is subsequently stripped off in vacuo at a bath temperature up to 100° C. To the resulting bis-trimethylsilyl compound is added 1-bromo-2,3,5-tri-O-benzoyl-ribofuranose (prepared from 7.7 g. of 1-O-acetyl-2,3,5-tri-O-benzoyl-ribofuranose), dissolved in 100 ml. of absolute benzene. After addition of 4 g. each of mercury-(II)-oxide and mercury-(II)-bromide, the mixture is heated for 4 hours under reflux. The reaction mixture is then cooled, and after addition of 3 ml. of methanol, is evaporated to dryness in a rotary evaporator. The residual foam is taken up in 200 ml. of chloroform. The insoluble matter is filtered off and the chloroform solution is extracted three times by shaking with altogether 200 ml. of 15% strength potassium iodide solution. The chloroform phase is washed once more with water, dried over sodium sulphate and concentrated to dryness in a rotary evaporator, when an amorphous product is obtained. The crude product is poured onto a dry silica gel column and then developed with chloroform/acetone (9:1) to the end of the column. The most slowly moving, blue fluorescent zone is cut out and eluated with ethyl acetate. After concentrating the eluate by evaporation, a colorless, amorphous product is obtained which is recrystallized from ethanol or n-propanol. 1-(1-β-D-2',3',5'-tri-O-benzoyl-ribofuranosidyl)-6,7-diphenyl-lumazine is thus obtained in the form of yellowish crystals which melt at 145–155° C. (with decomposition).

80 mg. of sodium is dissolved in 60 ml. of absolute methanol and 1-(1-β-D-2',3',5'-tri-O-benzoyl-ribofuranosidyl)-6,7-diphenyl-lumazine (2.3 g.) is added. After the mixture has been stirred for 16 hours at 25° C., water is added (120 ml. ), weakly acidified with glacial acetic acid at heat and thereafter slowly allowed to cool. After the mixture has been left to stand at −5° C., the crystals are collected and recrystallized from 50% strength aqueous methanol, when 1-(1-β-D-ribofuranosidyl)-6,7-diphenyl-lumazine of formula

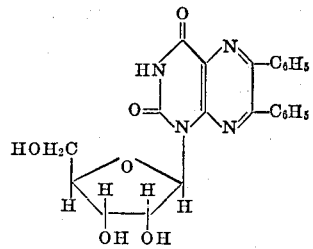

is obtained in the form of yellowish crystals which melt at 234–236° C.

EXAMPLE 9

2-oxo-4-amino-6,7-diphenyl-1,2-dihydro-pteridin (3 g.) is heated for 12 hours under reflux at 155° C. in 20 ml. of hexamethyldisilazane. After the reaction mixture has cooled, the excess hexamethyldisilazane is stripped off in vacuo and the residue dissolved in 200 ml. of absolute benzene. 1-bromo-2,3,5-tri-O-benzoyl-ribofuranose (prepared from 4.6 g. of 1-O-acetyl-2,3,5-tri-O-benzoyl-ribofuranose) in 200 ml. of absolute benzene is then added. After addition of 2.25 g. each of mercury-(II)-oxide and mercury-(II)-bromide, the reaction mixture is heated under reflux for 4 hours. The mercury salts are thereafter filtered off by suction, careful evaporation is effected and the residue is dissolved in 200 ml. of chloroform. The chloroform solution is extracted three times with 100 ml. each time of 25% strength potassium iodide solution, then washed with water. Finally, the organic phase is dried over sodium sulphate and after evaporation in vacuo, a crude product in the form of a foam is obtained. This foam is dissolved in as small an amount of ethyl acetate as possible and the solution then poured onto a silica gel column measuring 60 x 5.5 cms. Elution with ethyl acetate/chloroform (7.5:2.5) is effected. The first zone contains sugar derivatives and is discarded; from the second zone riboside is isolated after concentration by evaporation. Recrystallization from ethanol yields 1-(1-β-D-2', 3',5'-tri - O - benzoyl-ribofuranosidyl)-2-oxo-4-amino-6,7-diphenyl-1,2-dihydro-pteridin in the form of yellowish crystals which melt at 198° C.

1-(1-β-D-2',3',5' - tri - O - benzoyl-ribofuranosidyl)-2-oxo-4-amino-6,7-diphenyl-1,2-dihydro-pteridin (1.67 g.) is suspended in 100 ml. of absolute methanol and 46 mg. of sodium is added. The mixture is suspended in 100 ml. of absolute methanol and 46 mg. of sodium is added. The mixture is stirred for one day at 25° C. and the crystals that have formed are filtered with suction. After recrystallization from methanol/water (1:1), 1 - (1-β-D-ribofuranosidyl)-2-oxo-4-amino-6,7-diphenyl - 1,2 - dihydropteridin of formula

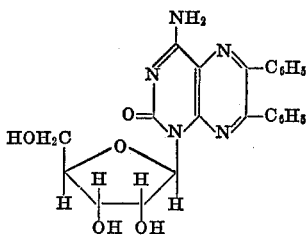

is obtained in the form of colorless crystals which melt at a temperature from 250° C. (with darkening).

EXAMPLE 10

1-(1-β-D-ribofuranosidyl) - 2 - oxo-4-amino-1,2-dihydro-pteridin (0.3 g.) is suspended in 200 ml. of absolute methanol and a strong flow of methylamine is introduced into the suspension with ice-cooling. The suspension is left to stand for several hours at 0° C. and thereafter for one week at 25° C. The crystal needles that have precipitated are collected by suction filtration and a further fraction is obtained from the filtrate by concentrating it to a smaller volume by evaporation. Recrystallization from methanol yields 1-(1-β-D-ribofuranosidyl) - 2 - oxo - 4 - methylamino-1,2-dihydro-pteridine of formula

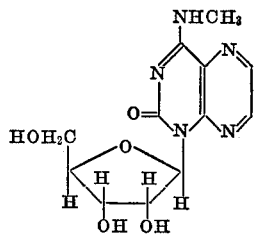

in the form of colorless crystal needles which melt at 243° C.

EXAMPLE 11

Tablets containing 50 mg. of active substance are manufactured in the usual way:

Composition:

| | Mg. |
|---|---|
| 1-(1-β-D-2'-desoxy-ribofuranosidyl) - 6,7 - diphenyl-lumazin | 50 |
| Wheat starch | 59 |
| Lactose | 70 |
| Colloidal silica | 10 |
| Talcum | 10 |
| Magnesium stearate | 1 |

1-(1-β-D-2' - desoxy-ribofuranosidyl) - 6,7 - diphenyl-lumazine is mixed with part of the wheat starch, with lactose and colloidal silica and the mixture passed through a sieve. A further portion of the wheat starch is pasted with five times its quantity of water on a water bath, and the mixture is kneaded with the paste until a slightly plastic mass is obtained. Then the remaining wheat starch, talcum and magnesium stearate are admixed and the mixture is compressed into tablets of 200 mg. each with dividing groove.

What is claimed is:

1. A compound selected from the group consisting of amines of the Formula V

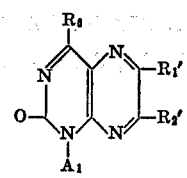

wherein $A_1$ stands for a member selected from 1-aldopentosidyl, 1-aldohexosidyl, mono-desoxygenated 1-aldopentosidyl, mono-desoxygenated 1-aldohexosidyl, said radicals having free hydroxyl groups, or hydroxyl groups esterified by lower alkanoyl or benzoyl and said radicals with hydroxyl groups etherified by phenyl-lower alkyl, $R_1'$ and $R_2'$ each stands for a member selected from hydrogen, lower alkyl, phenyl, lower alkyl phenyl, lower alkoxy phenyl, halogeno phenyl and trifluoromethyl phenyl, and $R_6$ stands for a member selected from hydroxy, lower alkoxy, mercapto, lower alkylmercapto, free amino, mono-lower alkylamino and di-lower alkylamino, and its pharmaceutically usable non-toxic acid addition salts.

2. A compound as claimed in claim 1, wherein $A_1$ stands for a member selected from 1-aldopentosidyl, 1-aldohexosidyl, mono-desoxygenated 1-aldopentosidyl, desoxygenated 1-aldohexosidyl and said radicals having free hydroxyl groups, or hydroxyl groups esterified by lower alkanoyl, or benzoyl and said radicals with hydroxyl groups etherified by benzyl, $R_1'$ and $R_2'$ each stands for a member selected from hydrogen, lower alkyl and phenyl, and $R_6$ stands for a member selected from hydroxy, free amino, mono-lower alkylamino and di-lower alkylamino.

3. A compound selected from 1-(1-D-glucopyranosidyl)-lumazine,
1-(1-D-ribofuranosidyl)-lumazine,
1-(1-D-ribofuranosidyl)-2-oxo-4-amino-1,2-dihydro-pteridine,
1-(1-D-ribofuranosidyl)-2-oxo-4-mercapto-1,2-dihydro-pteridine,
1-(1-D-glucopyranosidyl)-2-oxo-4-amino-6,7-dimethyl-1,2-dihydro-pteridine,
1-(1-D-ribofuranosidyl)-2-oxo-4-dimethylamino-1,2-dihydro-pteridine and
1-(1-D-ribofuranosidyl)-6,7-dimethyl-lumazine and their O-acetyl and O-benzoyl derivatives and a pharmaceutically usable non-toxic acid addition salt thereof.

4. A compound selected from 1-D-arabinofuranosidyl and 2-desoxy-1-ribofuranosidyl compounds which correspond to the compounds stated in claim 3.

5. A compound selected from 1-(1-D-arabinofuranosidyl)-2-oxo-4-amino-1,2-dihydro-pteridine,
1-(1-D-2-desoxyribofuranosidyl)-2-oxo-4-amino-1,2-dihydro-pteridine,
1-(1-D-arabinofuranosidyl)-2-oxo-4-mercapto-1,2-dihydro-pteridine,
1-(1-D-2-desoxyribofuranosidyl)-2-oxo-4-mercapto-1,2-dihydro-pteridine,
1-(1-D-arabinofuranosidyl)-lumazine,
1-(1-D-2-desoxyribofuranosidyl)-lumazine,
1-(1-D-ribofuranosidyl)-6,7-diphenyl-lumazine,
1-(1-D-ribofuranosidyl)-2-oxo-4-amino-6,7-diphenyl-1,2-dihydro-pteridine, and
1-(1-D-ribofuranosidyl)-2-oxo-4-methylamino-1,2-dihydro-pteridine and a pharmaceutically usable non-toxic acid addition salt thereof.

6. 1-(1-D-2 - desoxyribofuranosidyl) - 6,7 - diphenyllumazine and a pharmaceutically usable non-toxic acid addition salt thereof.

7. A β-anomer of a compound according to claim 1.

References Cited
UNITED STATES PATENTS
3,427,383  2/1969  Lapidus et al. ____ 260—211.5 R

OTHER REFERENCES
Pfleiderer et al.: "Chem. Abst." vol. 57, 1962, p. 932(c)–(i).
Pfleiderer et al.: Chem. Abst. vol. 60, 1964, p. 13307.
"Jour. of Biological Chemistry," vol. 239, p. 2580, 1964.

LEWIS GOTTS, Primary Examiner

J. R. BROWN, Assistant Examiner

U.S. Cl. X.R.

424—180

PO-1050
(5/69)

UNITED STATES PATENT OFFICE
CERTIFICATE OF CORRECTION

Patent No. 3,792,036  Dated February 12, 1974

Inventor(s) WOLFGANG PFLEIDERER

It is certified that error appears in the above-identified patent and that said Letters Patent are hereby corrected as shown below:

Column 18, lower left-hand portion of formula (in claim 1) should read

Column 18, line 34, after "aldohexosidyl, mono-desoxygenated 1-aldopentosidyl, insert -- mono- --.

Signed and sealed this 24th day of September 1974.

(SEAL)
Attest:

McCOY M. GIBSON JR.  C. MARSHALL DANN
Attesting Officer  Commissioner of Patents

PO-1050
(5/69)

UNITED STATES PATENT OFFICE 4-6929/1+2
CERTIFICATE OF CORRECTION

Patent No. 3,792,036        Dated February 12, 1974

Inventor(s) Wolfgang Pfleiderer

It is certified that error appears in the above-identified patent and that said Letters Patent are hereby corrected as shown below:

Column 1, line 6, delete "application Sweden" and substitute --- applications Switzerland ---.

Signed and sealed this 5th day of November 1974.

(SEAL)
Attest:

McCOY M. GIBSON JR.        C. MARSHALL DANN
Attesting Officer        Commissioner of Patents